H. BELMER.
FLY-TRAP.

No. 185,717. Patented Dec. 26, 1876.

Attest:
H. L. Perrine,
D. P. Cowl

Inventor:
Herman Belmer
by
Wm. H. Kincket
his atty.

THE GRAPHIC CO. N.Y.

UNITED STATES PATENT OFFICE.

HERMAN BELMER, OF CINCINNATI, OHIO.

IMPROVEMENT IN FLY-TRAPS.

Specification forming part of Letters Patent No. 185,717, dated December 26, 1876; application filed May 19, 1876.

*To all whom it may concern:*

Be it known that I, HERMAN BELMER, of Cincinnati, in the county of Hamilton, in the State of Ohio, have invented a new and useful Improvement in Fly-Traps, of which the following is a full, clear, and exact description:

My invention relates to that class of fly-traps which have a wire-gauze receiver, and which have or have not, as preferred, a cone of similar material; and the invention consists in providing such fly-traps with a bait-pan, constituting the base, which is covered with a piece of perforated or reticulated material, to prevent access by the flies to the bait in said pan, and which is combined with triangular or other shaped passages, open at their widest ends, and having their contracted ends also open, arranged above the bait-pan cover, and constituting entrances for the flies into the trap or receiver, the contracted openings preventing the escape of the flies when they are once within the receiver.

Figure 1:
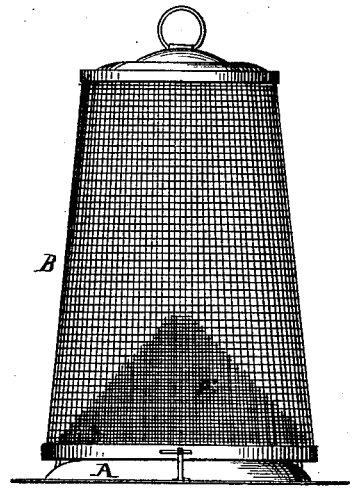
Figure 2:
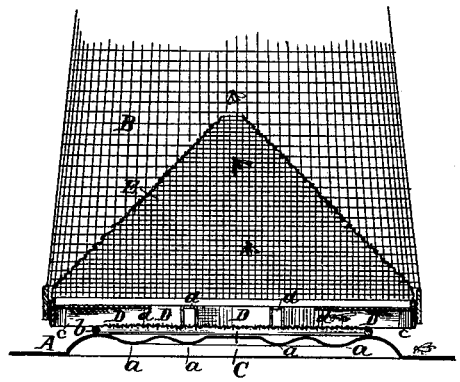
Figures 3, 4:
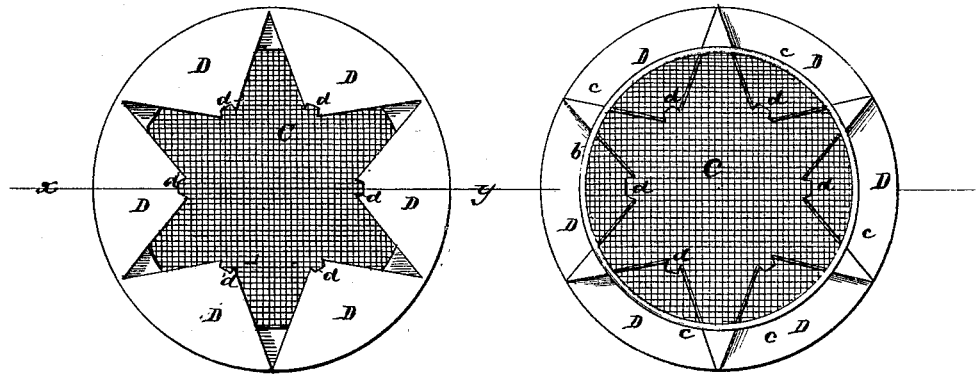

In the drawings illustrating my invention, Figure 1 is a side elevation; Fig. 2, a vertical cross-section on line $x\ y$ of Fig. 3. Figs. 3 and 4 are top and bottom views, respectively, of the cover and passages removed from the receiver.

A is the base of the trap, made with one or more grooves or depressions, $a\ a$, or in the form of a pan, and adapted to receive the bait or fly-attracting material. To this is secured, in any suitable manner, the reticulated receiver B. Above the pan or base A I arrange a piece of reticulated material, C, whose edge may be protected by a binding-wire, $b$. This cover C, as I shall designate it, is of such size as to extend entirely over the depressions or depression in the base, so as to prevent access by the flies to the bait therein. Above the cover C, and attached to it, if desired, are arranged a number of triangular, wedge, or other shaped devices, D D. These devices D D are formed of solid or perforated sheet metal, or of wire-netting, and have their outer ends $c$ open, and also have an opening, $d$, at their inner or contracted portions, and constitute passages, through which the flies enter into the receiver, the contracted openings $d$ misleading them in, and the cover C frustrating any attempt to escape.

It will be observed that each of the passages D forms a trap of itself, so that the ordinary cone E (here shown) may or may not be used. Its employment will, however, afford an additional safeguard.

Having thus described my invention, what I claim is—

1. In a fly-trap, the combination of inlet-passages, having openings outside of the receiver, and contracted openings within the receiver, with a covered bait-pan, substantially as described.

2. The combination, in a fly-trap, of inlet-passages D and cover C, substantially as and for the purpose described.

3. The combination of inlet-passages D, cover C, base A, and receiver B, substantially as described.

HERMAN BELMER.

Witnesses:
L. C. BRAMKAMP,
JOHN M. TORRANCE.